(12) United States Patent
Saito

(10) Patent No.: US 11,150,463 B2
(45) Date of Patent: Oct. 19, 2021

(54) OPTICAL MODULE AND ELECTRONIC APPARATUS

(71) Applicant: Seiko Epson Corporation, Tokyo (JP)

(72) Inventor: Daisuke Saito, Matsumoto (JP)

(73) Assignee: Seiko Epson Corporation

( * ) Notice: Subject to any disclaimer, the term of this patent is extended or adjusted under 35 U.S.C. 154(b) by 83 days.

(21) Appl. No.: 16/047,069

(22) Filed: Jul. 27, 2018

(65) Prior Publication Data

US 2019/0033572 A1 Jan. 31, 2019

(30) Foreign Application Priority Data

Jul. 28, 2017 (JP) .............................. JP2017-146221

(51) Int. Cl.
*G02B 26/00* (2006.01)
*G01J 3/02* (2006.01)
(Continued)

(52) U.S. Cl.
CPC .............. *G02B 26/001* (2013.01); *B41J 2/01* (2013.01); *G01J 3/0202* (2013.01);
(Continued)

(58) Field of Classification Search
CPC ........ G02B 26/001; G02B 5/28; G02B 5/284; G02B 5/285; G02B 6/29395; G02B 1/10; G02B 26/002; G02B 26/007; G02B 27/0006; G02B 5/20; G02B 5/201; G02B 5/288; G02B 6/29358; G02B 1/005; G02B 26/02; G02B 26/023; G02B 26/06; G02B 5/208; G02B 7/006; G02B 13/22; G02B 17/04; G02B 1/11; G02B 2207/101; G02B 26/008; G02B 26/0833; G02B 26/0841; G02B 27/00; G02B 27/0911; G02B 27/286; G02B 5/00; G02B 5/08; G02B 5/0816; G02B 5/085; G02B 5/10; G02B 5/22; G02B 5/26; G02B 5/281; G02B 5/287;
(Continued)

(56) References Cited

U.S. PATENT DOCUMENTS

2009/0282915 A1    11/2009   Ohta et al.
2010/0253769 A1*   10/2010   Coppeta ................. G02B 30/24
                                                                  348/58
(Continued)

FOREIGN PATENT DOCUMENTS

JP    2002-195834 A    7/2002
JP    2006-100545 A    4/2006
(Continued)

*Primary Examiner* — Collin X Beatty
*Assistant Examiner* — Grant A Gagnon
(74) *Attorney, Agent, or Firm* — Harness, Dickey & Pierce, P.L.C.

(57) ABSTRACT

An optical module includes: a filter holding member to which an interference filter having a pair of mirrors facing each other is fixed; a base to which the filter holding member is fixed; and a first fixing member which fixes the filter holding member to the base. In the optical module, $k<m\omega^2/2$ is satisfied, where k is a spring constant of the first fixing member, $\omega$ is a frequency of vibration generated in the base, and m is a total mass of the interference filter and the filter holding member.

8 Claims, 10 Drawing Sheets

(51) Int. Cl.
*B41J 2/01* (2006.01)
*G01J 3/50* (2006.01)
*G01J 3/26* (2006.01)

(52) U.S. Cl.
CPC .............. *G01J 3/0229* (2013.01); *G01J 3/26* (2013.01); *G01J 3/501* (2013.01)

(58) Field of Classification Search
CPC .. G02B 5/289; G02B 6/12007; G02B 6/1226; G02B 6/24; G02B 6/262; G02B 6/29346; G02B 6/29359; G02B 6/29368; G02B 6/2938; G02B 6/3514; G02B 6/3518; G02B 6/353; G02B 6/357; G02B 6/3584; G02B 6/3616; G02B 6/4209; G02B 6/4215; G02B 7/003; G02B 7/005; G01J 3/26; G01J 3/51; G01J 3/50; G01J 3/027; G01J 3/2823; G01J 3/10; G01J 3/32; G01J 2003/1213; G01J 3/0264; G01J 3/0291; G01J 3/42; G01J 1/0488; G01J 3/0208; G01J 3/44; G01J 2003/1234; G01J 2003/1247; G01J 3/12; G01J 3/46; G01J 3/502; G01J 3/513; G01J 1/04; G01J 1/0411; G01J 1/44; G01J 2003/064; G01J 2003/2826; G01J 3/0205; G01J 3/021; G01J 3/0229; G01J 3/0262; G01J 3/0272; G01J 3/0294; G01J 3/06; G01J 3/1804; G01J 3/28; G01J 3/2803; G01J 3/36; G01J 3/45; G01J 3/4535; G01J 3/4537
USPC ........................................................ 359/578
See application file for complete search history.

(56) References Cited

U.S. PATENT DOCUMENTS

| | | |
|---|---|---|
| 2011/0094303 A1 | 4/2011 | Ohta et al. |
| 2013/0098155 A1 | 4/2013 | Ohta et al. |
| 2014/0053648 A1 | 2/2014 | Ohta et al. |
| 2016/0091644 A1 | 3/2016 | Saito et al. |
| 2016/0187197 A1* | 6/2016 | Hirokubo .................. G01J 3/12 250/206 |
| 2016/0370230 A1 | 12/2016 | Nishimura |
| 2017/0091960 A1* | 3/2017 | Wang .................... G06T 11/001 |

FOREIGN PATENT DOCUMENTS

| | | |
|---|---|---|
| JP | 2007024688 A | 2/2007 |
| JP | 2010-181392 A | 8/2010 |
| JP | 2015-141066 A | 8/2015 |
| JP | 2015-227970 A | 12/2015 |
| JP | 2016-071039 A | 5/2016 |
| JP | 2017-009358 A | 1/2017 |
| WO | 2014/051017 A1 | 4/2014 |

* cited by examiner

OPTICAL MODULE AND ELECTRONIC APPARATUS

BACKGROUND

1. Technical Field

The present invention relates to an optical module and an electronic apparatus.

2. Related Art

According to the related art, an interference filter having a pair of mirrors arranged facing each other is known. Also, an optical filter device having an interference filter accommodated in a sealed space of a package casing is known (see, for example, JP-A-2015-227970).

In the optical filter device disclosed in JP-A-2015-227970, the interference filter is fixed to a part of the casing via a damping member. In such an optical filter device, the damping member restrains vibrations of the interference filter when the interference filter vibrates. Therefore, for example, even if the interference filter vibrates when driven, flexure of the mirrors of the interference filter due to the vibrations can be restrained.

If the casing (package casing) of the optical filter device as described above is fixed to a predetermined base of an electronic apparatus, disturbance vibrations may be transmitted to the package casing from the base. In the optical filter device disclosed in JP-A-2015-227970, the influence of vibrations of the interference filter itself can be restrained but the influence of such disturbance vibrations is difficult to eliminate. The disturbance vibrations transmitted to the interference filter from the base via the package casing cause the interference filter to vibrate. In this case, the wavelength of light outputted from the interference filter changes, generating the problem of being unable to output light of a desired wavelength with high accuracy.

SUMMARY

An advantage of some aspects of the invention is that an optical module which can output light of a predetermined wavelength with high accuracy and an electronic apparatus are provided.

An optical module according to an application example of the invention includes: a filter holding member to which an interference filter having a pair of mirrors facing each other is fixed; a base to which the filter holding member is fixed; and a first fixing member which fixes the filter holding member to the base. In the optical module, $k<m\omega^2/2$ is satisfied, where k is a spring constant of the first fixing member, $\omega$ is a frequency of vibration generated in the base, and m is a total mass of the interference filter and the filter holding member.

In this application example, the spring constant k of the first fixing member satisfies the condition of $k<m\omega^2/2$. In this case, the rate of transmission of vibrations from the base to the casing is less than 1.0. This reduces vibrations from the base to the filter holding member and also restrains vibrations of the interference filter. Thus, changes in the wavelength of light transmitted through the interference filter can be restrained, making it possible for the interference filter to transmit light of a desired wavelength with high accuracy.

In the optical module according to the application example, it is preferable that the spring constant of the first fixing member satisfies $k<m\omega^2/12.25$.

In the application example with this configuration, the rate of transmission of vibrations from the base to the casing can be reduced to 0.5 or lower, regardless of the damping coefficient of the first fixing member. This can restrain vibrations from the base to the filter holding member more effectively.

In the optical module according to the application example, it is preferable that the interference filter is fixed to the filter holding member via a second fixing member, and that the second fixing member has a spring constant greater than the spring constant of the first fixing member.

To fix the interference filter to the filter holding member via the second fixing member, an elastic member to damp vibrations is normally used as the second fixing member in order to reduce the influence of vibrations of the interference filter itself.

The first fixing member has a spring constant satisfying $k<m\omega^2/2$, as described above. If the interference filter is fixed to the filter holding member via the second fixing member having a smaller spring constant, the attitude of the interference filter cannot be maintained. For example, if the interference filter is fixed at one position to the filter holding member (casing) as described in JP-A-2015-227970, the interference filter tilts about the second fixing member (connecting position to the filter holding member).

In contrast, the second fixing member having a greater spring constant than the first fixing member, as described above, can properly fix the interference filter to the filter holding member while restraining the tilt and flexure of the interference filter, and can also restrain vibrations of the interference filter itself.

It is preferable that the optical module according to the application example includes a light receiving unit which receives light transmitted through the interference filter, and a third fixing member which fixes the light receiving unit to the base, and that the third fixing member has a spring constant greater than the spring constant of the first fixing member.

In the application example with this configuration, the optical module has the light receiving unit receiving light through the interference filter. The light receiving unit is fixed to the base via the third fixing member having a greater spring constant than the first fixing member. With such a configuration, the relative positional relation between the base and the light receiving unit does not change even if disturbance vibrations occur in the base. Thus, the distance between a measurement target object and the light receiving unit does not change. This can restrain changes in measurement accuracy.

An electronic apparatus according to an application example of the invention includes: an optical module as described above; and a control unit which controls the optical module.

In this application example, as in the foregoing application example, even if vibrations are applied to the electronic apparatus, the inconvenience of the vibrations being transmitted to the filter holding member with the interference filter fixed thereto can be restrained. This can restrain vibrations of the interference filter and flexure of the mirrors. Thus, higher accuracy can be achieved in various kinds of processing using the optical module in the electronic apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
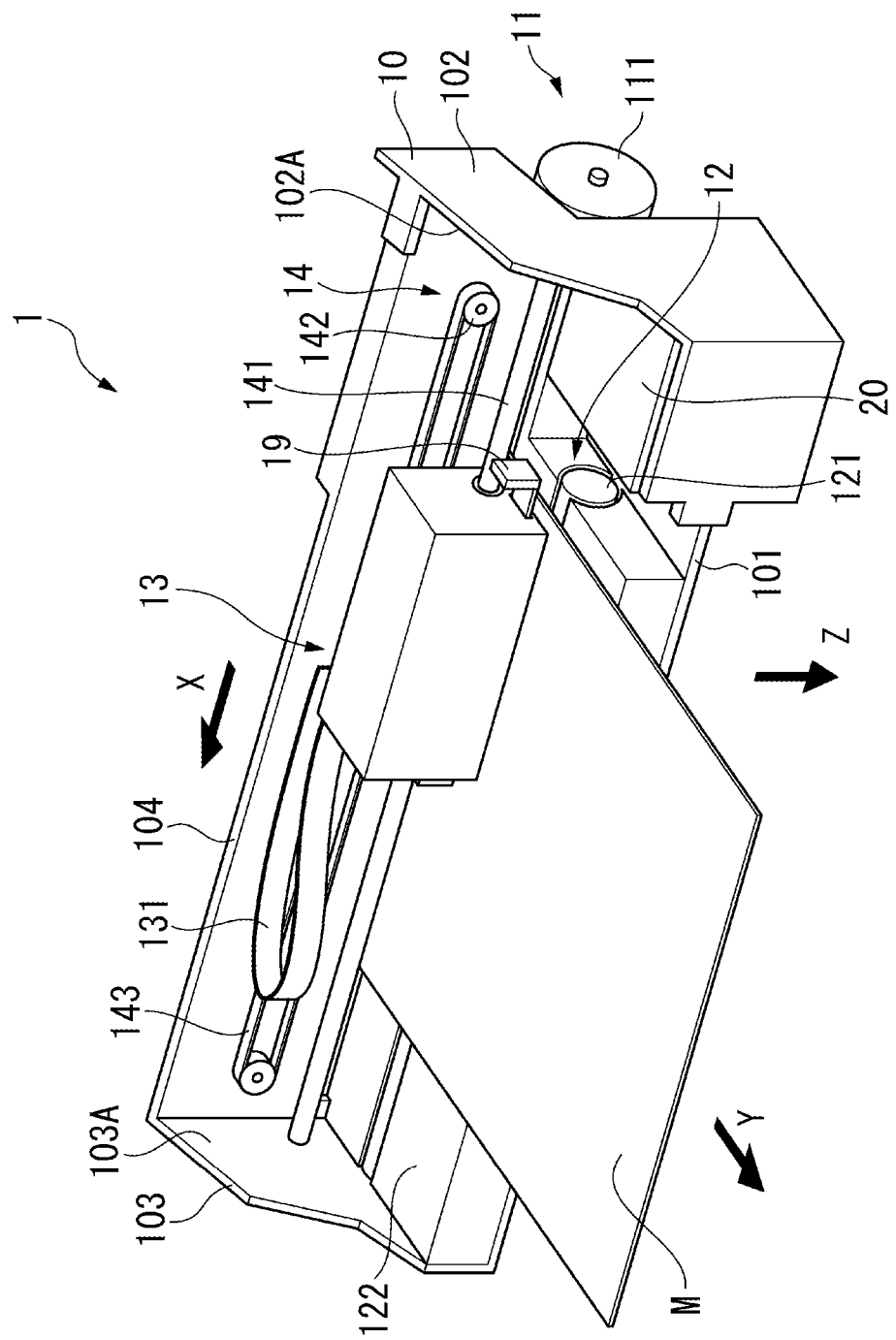
FIG. 1 is an external view showing a schematic configuration of a printer according to an embodiment of the invention.
Figure 2:
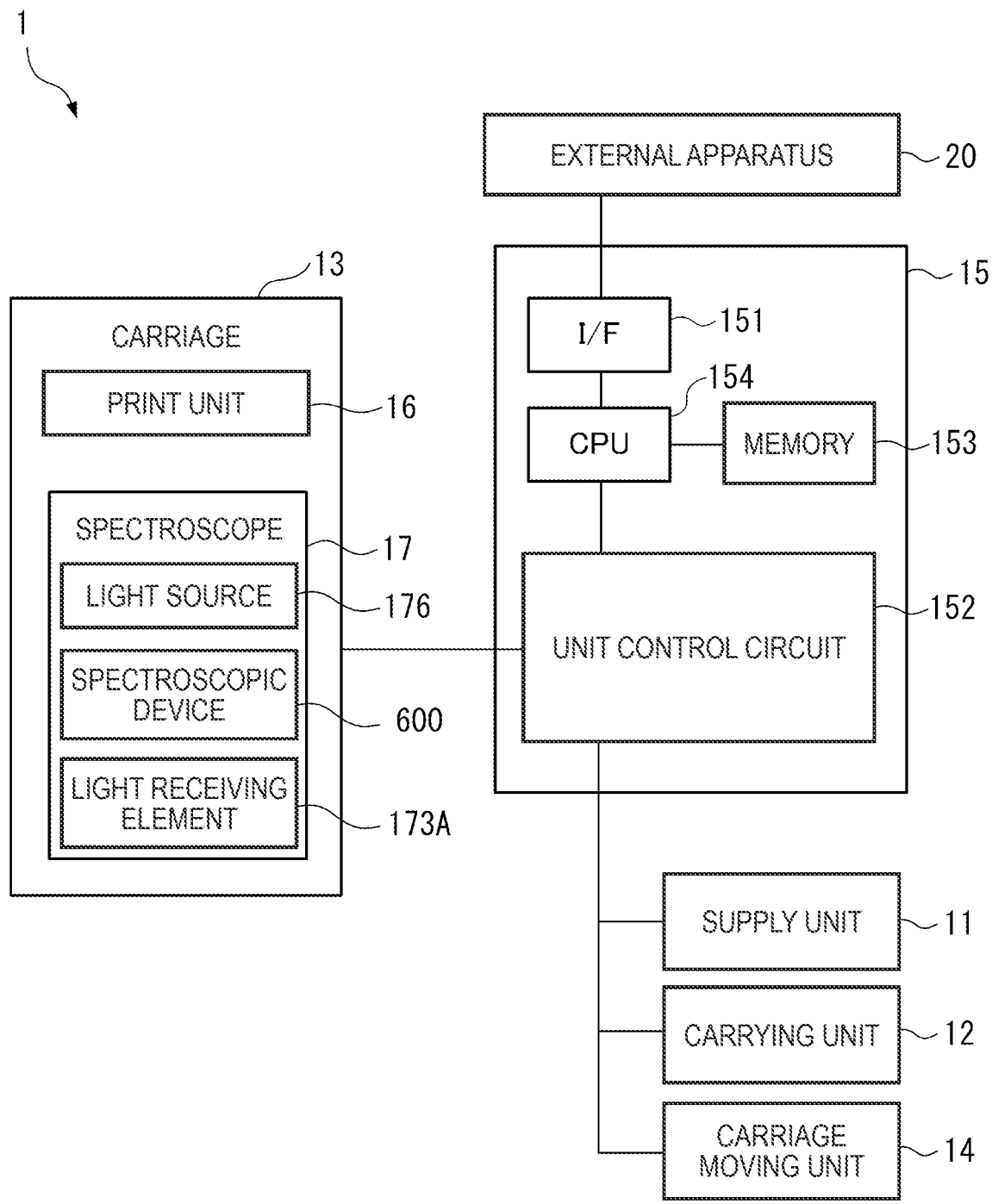
FIG. 2 is a block diagram showing a schematic configuration of the printer according to the embodiment.

An embodiment of the invention will be described below, referring to the drawings. In the embodiment, a printer (inkjet printer) will be described as an example of an electronic apparatus having an optical module according to the invention.
Schematic Configuration of Printer FIG. 1 is a perspective view showing an example of the external configuration of the printer 1 according to the embodiment. FIG. 2 is a block diagram showing a schematic configuration of the printer 1 according to the embodiment.

As shown in FIG. 1, the printer 1 is equivalent to the electronic apparatus according to the invention and includes a unit casing 10, a supply unit 11, a carrying unit 12, a carriage 13, a carriage moving unit 14, and a control unit 15 (see FIG. 2) equivalent to the control unit according to the invention. The carriage 13 is provided with a print unit 16 and a spectroscope 17, as shown in FIG. 2.

The printer 1 controls the units 11, 12, 14 and the carriage 13, based on print data inputted from an external apparatus 20 such as a personal computer, and prints an image on a medium M. The printer 1 in this embodiment also forms a color patch (pattern image) for color measurement at a predetermined position on the medium M, based on preset calibration print data, and carries out spectroscopic measurement on the color patch. Thus, the printer 1 compares a measured value on the color patch with the calibration print data and carries out various kinds of correction processing when printing.

Each component of the printer 1 will now be described specifically.

The supply unit 11 is a unit which supplies the medium M to be an image forming target, to an image forming position. The supply unit 11 has, for example, a roll body 111 with the medium M wound thereon, a roll drive motor (not illustrated), and a roll drive wheel train (not illustrated) or the like. Based on a command from the control unit 15, the roll drive motor is rotationally driven. The rotating force of the roll drive motor is transmitted to the roll body 111 via the roll drive wheel train. This causes the roll body 111 to rotate, supplying a sheet of paper wound on the roll body 111 downstream in a Y direction (sub scanning direction), that is, in a +Y direction.

While the embodiment shows an example where the sheet of paper wound on the roll body 111 is supplied, this example is not limiting. The medium M may be supplied by any supply method. For example, the medium M in the form of sheets of paper stacked on a tray or the like may be supplied, for example, one by one, by a roller or the like.

The carrying unit 12 carries the medium M supplied from the supply unit 11, along the Y direction. The carrying unit 12 has a carrying roller 121, a driven roller (not illustrated) arranged so as to interpose the medium between the carrying roller 121 and the driven roller and following the carrying roller 121, and a platen 122.

The driving force from a carrying motor, not illustrated, is transmitted to the carrying roller 121. When the carrying motor is driven under the control of the control unit 15, the carrying roller 121 is rotationally driven by the rotational force and carries the medium M along the Y direction, with the medium M held between the carrying roller 121 and the driven roller. The platen 122 facing the carriage 13 is provided downstream of the carrying roller 121 in the Y direction, that is, on the +Y side.

The carriage 13 has the print unit 16, which prints an image on the medium M, and the spectroscope 17, which carries out spectroscopic measurement at a predetermined measurement position P (see FIG. 3) on the medium M.

The carriage 13 is provided in such a way as to be movable by the carriage moving unit 14 along a main scanning direction (X direction) intersecting the Y direction.

The carriage 13 is connected to the control unit 15 by a flexible circuit 131 and carries out print processing by the print unit 16 and spectroscopic measurement processing by the spectroscope 17, based on a command from the control unit 15.

Details of the configuration of the carriage 13 will be described later.

The carriage moving unit 14 forms a moving mechanism according to the invention and moves the carriage 13 to reciprocate along the X direction, based on a command from the control unit 15.

The carriage moving unit 14 includes, for example, a carriage guide shaft 141, a carriage motor 142, and a timing belt 143.

The carriage guide shaft 141 is arranged along the X direction and has its both ends fixed to, for example, the casing of the printer 1. The carriage motor 142 drives the timing belt 143. The timing belt 143 is supported substantially parallel to the carriage guide shaft 141 and has a part of the carriage 13 fixed thereto. When the carriage motor 142 is driven based on a command from the control unit 15, the timing belt 143 is made to travel forward and backward. This causes the carriage 13 fixed to the timing belt 143 to reciprocate, guided by the carriage guide shaft 141.

The control unit 15 includes an I/F 151, a unit control circuit 152, a memory 153, and a CPU (central processing unit) 154, as shown in FIG. 2.

The I/F 151 input print data inputted from the external apparatus 20, to the CPU 154.

The unit control circuit 152 has a control circuit which controls each of the supply unit 11, the carrying unit 12, the carriage moving unit 14, the print unit 16, and the spectroscope 17. The unit control circuit 152 controls the operation of each unit, based on a command signal from the CPU 154. The control circuit for each unit may be provided separately from the control unit 15 and connected to the control unit 15.

The memory 153 stores various programs and various data to control the operation of the printer 1. The various data may be, for example, print profile data which stores the amount of each ink ejected corresponding to color data included as print data, and drive table data to drive a spectroscopic device 600. The memory 153 may also store light emitting characteristics to each wavelength of a light source 176, described later, and spectroscopic characteristic of the spectroscopic device 600, or the like.

The CPU 154 reads out and executes the various programs stored in the memory 153 and thus carries out drive control on the supply unit 11, the carrying unit 12, and the carriage moving unit 14, print control on the print unit 16, spectroscopic measurement control on the spectroscope 17, and correction processing (for example, correction of uneven density, correction of color shift) or the like based on the result of spectroscopic measurement).

Configuration of Carriage

Next, the configuration of the carriage 13, and the print unit 16 and the spectroscope 17 provided in the carriage 13, will be described.

Configuration of Print Unit

The print unit 16 carries out print processing at a part facing the medium M, in which the print unit 16 ejects individual droplets of ink on the medium M and thus forms an image on the medium M, based on a command signal from the control unit 15 (image forming processing on the medium M).

Configuration of Spectroscope

Figure 3:
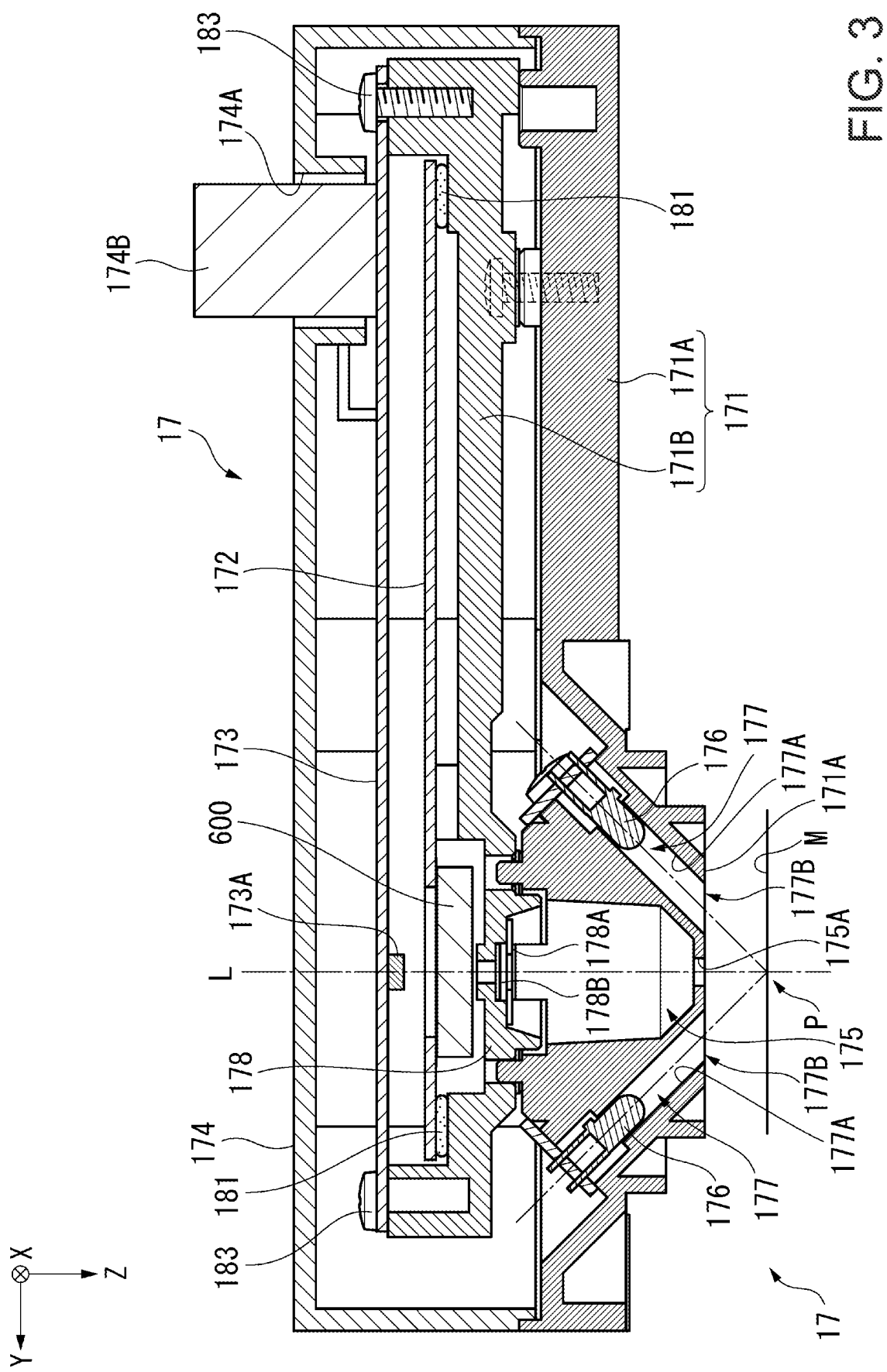
FIG. 3 is a cross-sectional view showing a schematic configuration of a spectroscope according to the embodiment.

FIG. 3 is a cross-sectional view showing a schematic configuration of the spectroscope 17.

The spectroscope 17 forms the optical module according to the invention and has a base 171, a filter holding substrate 172 held (fixed) on the base 171, a light receiving element holding substrate 173 fixed to the base 171, and a cover section 174, as shown in FIG. 3.

The base 171 is brought into contact with the carriage 13 and fixed there, for example, with a screw or the like. The base 171 has a first base section 171A and a second base section 171B. The first base section 171A has a measurement light introducing section 175 through which light reflected at a measurement position P on the medium M passes, and a light source arrangement section 177 where a light source 176 is arranged.

The measurement light introducing section 175 is a penetration hole, for example, along a Z direction, and has a window section 175A at an end part on the +Z side. On the −Z side of the measurement light introducing section 175, an optical holding section 178 which holds an incident optical system including, for example, an aperture 178A and an incident lens 178B, is fixed. The optical axis (measurement optical axis L) of the window section 175A, the aperture 178A, and the incident lens 178B coincides with the optical axis of the spectroscopic device 600 (variable-wavelength interference filter 5) and a light receiving element 173A (light receiving unit), described later.

The light source arrangement section 177 has, for example, a cylindrical hole section 177A whose center axis approaches the measurement optical axis L as it goes toward the +Z side. On the −Z side of the cylindrical hole section 177A, the light source 176 is fixed. The light source 176 can be, for example, an LED. An LED substrate provided with the LED is fixed to an end part on the −Z side of the cylindrical hole section 177A, for example, with a screw, thus fixing the LED (light source 176) on the base 171. The substrate (LED substrate or the like) holding the light source 176 is connected to a connector 174B, described later.

An end part on the +Z side of the cylindrical hole section 177A is an illumination window 177B through which the light of the light source 176 is emitted. The illumination window 177B faces the medium M placed on the platen 122. When the light source 176 is turned on, illumination light is cast at the measurement position P within a predetermined range around the point of intersection between the medium M and the measurement optical axis L. In this embodiment, spectroscopic measurement is carried out according to a method under an optical geometry condition (45° x: 0°) prescribed by the color measurement standard (JIS Z8722). That is, in this embodiment, the illumination light from the light source 176 is made incident at an angle of incidence of 45°±2° to the measurement position P, and the light reflected by a measurement target into a normal direction with 0°±10° becomes incident on the light receiving element 173A along the measurement optical axis L.

The second base section 171B is fixed to the first base section 171A, for example, with a screw or the like. The filter holding substrate 172 and the light receiving element holding substrate 173 are fixed to the second base section 171B.

The filter holding substrate 172 is fixed to the base 171 via a first fixing member 181. Details of the first fixing member 181 will be described later.

The spectroscopic device 600 is fixed on the filter holding substrate 172. To fix the spectroscopic device 600 on the filter holding substrate 172, for example, the spectroscopic device 600 is brought into contact with the filter holding substrate 172 and fixed there with a screw or the like. In this example, the filter holding substrate 172 and a casing 610 of the spectroscopic device 600 are separate bodies firmly fixed to each other with a screw. However, this example is not limiting. For example, the filter holding substrate 172 and the casing 610 of the spectroscopic device 600 (see FIG. 4) may be integrated together.

Figure 4:
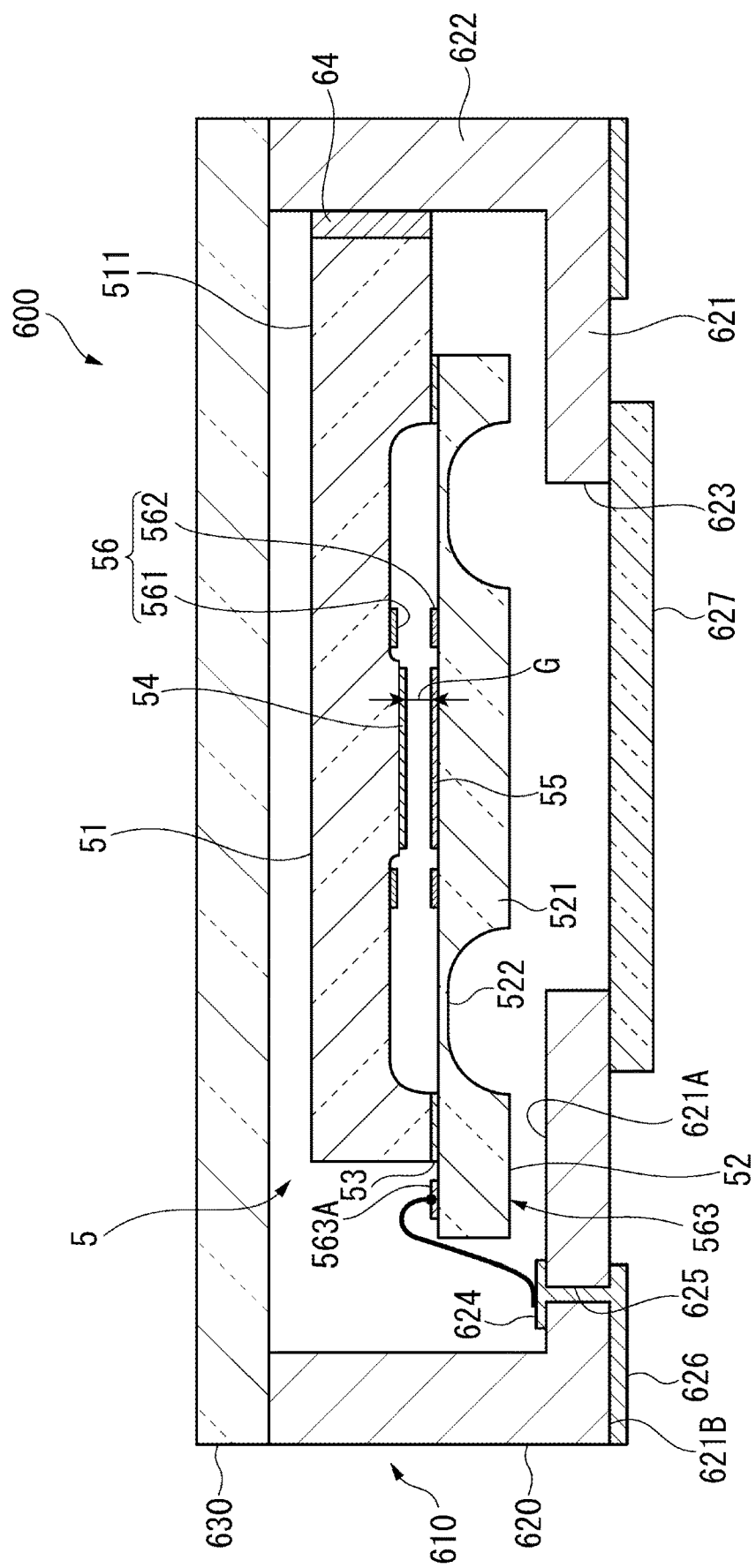
FIG. 4 is a cross-sectional view showing a schematic configuration of a spectroscopic device according to the embodiment.

FIG. 4 is a cross-sectional view showing a schematic configuration of the spectroscopic device 600.

As shown in FIG. 4, the spectroscopic device 600 has the casing 610 and a variable-wavelength interference filter (the interference filter according to the invention) accommodated inside the casing 610. Here, the casing 610 and the filter holding substrate 172 on which the casing 610 is fixed form the filter holding member according to the invention.

The casing 610 has a base 620 and a lid 630, as shown in FIG. 4. The base 620 and the lid 630 are joined together, thus forming an accommodation space therein. The variable-wavelength interference filter 5 is accommodated inside the accommodation space.

Schematic Configuration of Variable-Wavelength Interference Filter

The variable-wavelength interference filter 5 has a first substrate 51 and a second substrate 52 facing the first substrate 51. On the surface facing the second substrate 52 of the first substrate 51, a first mirror 54 is provided. On the surface facing the first substrate 51 of the second substrate 52, a second mirror 55 facing the first mirror 54 is provided. That is, the first mirror 54 and the second mirror 55 are equivalent to the pair of mirrors according to the invention and are arranged facing each other via a mirror gap G.

The first mirror 54 and the second mirror 55 are made up of, for example, a metal film or a dielectric multilayer film. To form the first mirror 54 and the second mirror 55 made up of a dielectric multilayer film, electrically conductive films (for example, an ITO film and a metal thin film of Ag or the like) are stacked. This enables the first mirror 54 and the second mirror 55 to be electrically conductive and also function as a capacitance detection unit.

The second substrate 52 is provided with a movable section 521 on which the second mirror 55 is provided, and a diaphragm section 522 provided on the outer circumference of the movable section 521 and having a smaller thickness than the movable section 521.

The first substrate 51 has a first electrode 561 on the surface facing the second substrate 52. The second substrate 52 has a second electrode 562 facing the first electrode 561. The first electrode 561 and the second electrode 562 form an electrostatic actuator 56. Applying a voltage between the first electrode 561 and the second electrode 562 causes the diaphragm section 522 of the second substrate 52 to flex and causes the movable section 521 to be displaced toward the first substrate 51. The dimension of the mirror gap G (mirror gap dimension) thus changes. This enables the variable-wavelength interference filter 5 to transmit light with a wavelength corresponding to the mirror gap dimension.

In the variable-wavelength interference filter 5 in this embodiment, one end part of the first substrate 51 forms a filter fixing end 511 protruding further outward than one end part of the second substrate 52. The filter fixing end 511 is fixed to the casing 610 via a second fixing member 64.

The other end part opposite to the one end part of the second substrate 52 protrudes further outward than the other end part of the first substrate 51 and forms an electrical equipment section 563. On the electrical equipment section 563, a wire 563A connected independently to each of the first mirror 54, the second mirror 55, the first electrode 561, and the second electrode 562 is arranged and connected to a terminal (internal terminal section 624) provided in the casing 610.

Configuration of Casing

The casing 610 is made up of the base 620 and the lid 630, as described above. The base 620 is made up of, for example, ceramics, and has a pedestal section 621 and a sidewall section 622.

The pedestal section 621 is forms in the shape of a flat plate having, for example, a rectangular outer shape as viewed in a plan view of the filter. The sidewall section 622 in a cylindrical shape rises toward the lid 630 from an outer circumferential part of the pedestal section 621.

The pedestal section 621 has an opening 623 penetrating the pedestal section 621 in a direction of thickness along the optical axis (measurement optical axis L) of the light receiving element 173A. The opening 623 is provided in such a way as to include an area overlapping the first mirror 54 and the second mirror 55 as viewed in a plan view of the pedestal section 621 seen from the direction of thickness, in the state where the variable-wavelength interference filter 5 is accommodated in the casing 610.

On the surface (base outer surface 621B) opposite to the lid 630 of the pedestal section 621, a glass member 627 covering the opening 623 is joined.

On the inner surface (base inner surface 621A) facing the lid 630 of the pedestal section 621, the internal terminal section 624 connected to the wire 563A provided on the electrical equipment section 563 of the variable-wavelength interference filter 5 is provided. The internal terminal section 624 and the wire 563A of the electrical equipment section 563 can be connected together, for example, by wire bonding using an Au wire or the like, or by FPC (flexible printed circuits) or the like.

The pedestal section 621 also has a penetration hole 625 at the position where the internal terminal section 624 is provided. The internal terminal section 624 is connected to an external terminal section 626 provided on the base outer surface 621B of the pedestal section 621 via the penetration hole 625. The first mirror 54, the second mirror 55, the first electrode 561, and the second electrode 562 of the variable-wavelength interference filter 5 are connected from the electrical equipment section 563 to a filter control section 172A (see FIG. 5) via the internal terminal section 624 and the external terminal section 626.

The sidewall section 622 rises from an edge part of the pedestal section 621. An end surface of the sidewall section 622 provided around the peripheries of the base inner surface 621A is, for example, a flat surface parallel to the base inner surface 621A and has the lid 630 joined thereto. The lid 630 is, for example, a transparent member having a rectangular outer shape as viewed in a plan view and is made up of, for example, glass or the like.

The filter fixing end 511 of the variable-wavelength interference filter 5 is fixed to, for example, the sidewall section 622 of the base 620 via the second fixing member 64.

While an example where the variable-wavelength interference filter 5 is fixed to the sidewall section 622 is described in this embodiment, this is not limiting. For example, the variable-wavelength interference filter 5 may be fixed to the pedestal section 621.

The second fixing member 64 may be provided at a plurality of positions. However, it is preferable that the variable-wavelength interference filter 5 is fixed at one position in order to restrain transmission of the stress of the second fixing member 64 to the variable-wavelength interference filter 5.

For such a second fixing member 64, a material having a greater spring constant than the first fixing member 181 is used. Specifically, it is preferable that the spring constant of the second fixing member 64 is 0.1 N/mm or greater and 5.0 N/mm or smaller. If the spring constant of the second fixing member 64 is smaller than 0.1 N/mm, the strength of fixture of the variable-wavelength interference filter 5 is insufficient, making it difficult to maintain the attitude of the variable-wavelength interference filter 5. For example, if the variable-wavelength interference filter 5 is fixed to the sidewall section 622, as shown in FIG. 4, the variable-wavelength interference filter 5 may tilt about the filter fixing end 511 (second fixing member 64). If the spring constant of the second fixing member 64 greater than 5.0 N/mm, the variable-wavelength interference filter 5 may vibrate when driven. This may cause the first mirror 54 and the second mirror 55 to flex or may cause the second mirror 55 to tilt in relation to the first mirror 54. Meanwhile, with the spring constant within the above range, the attitude of the variable-wavelength interference filter 5 can be maintained at a predetermined position. Also, even if the movable section 521 and the diaphragm section 522 vibrate when the electrostatic actuator 56 is driven, the inconvenience of the variable-wavelength interference filter 5 resonating due to the vibration can be restrained.

Configuration of Filter Holding Substrate

Back to FIG. 3, the filter holding substrate 172 has a penetration hole facing the opening 623 of the spectroscopic device 600 and along the measurement optical axis L. Through the penetration hole, the light transmitted through the spectroscopic device 600 passes toward the light receiving element 173A.

The filter holding substrate 172 is also provided with various circuits which control the variable-wavelength interference filter 5. The circuits are connected to a connector 175B.

Figure 5:
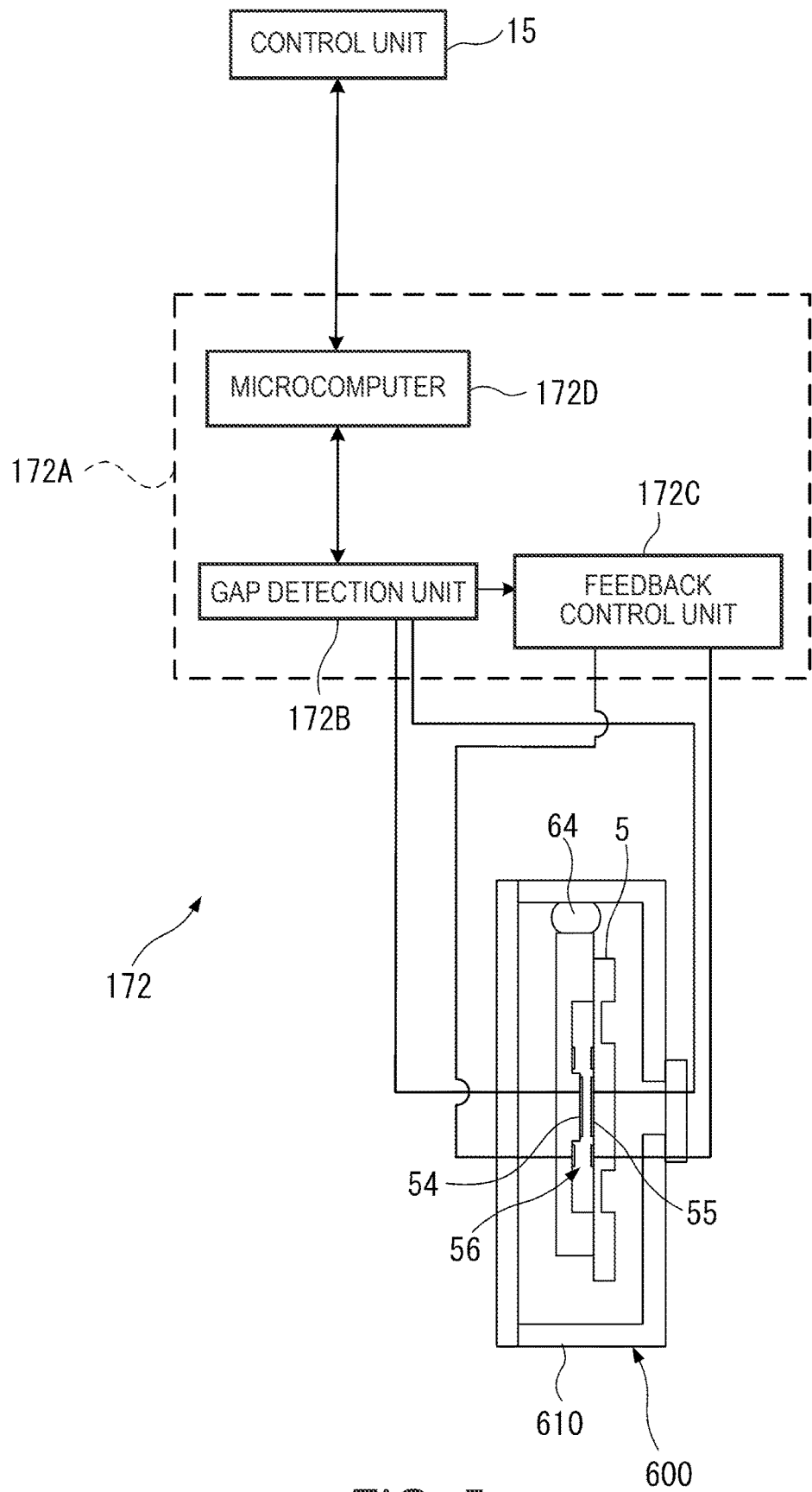
FIG. 5 shows a schematic configuration of a filter holding substrate according to the embodiment.

FIG. 5 shows the configuration of the filter holding substrate 172.

As shown in FIG. 5, the filter holding substrate 172 is provided with the filter control section 172A controlling the variable-wavelength interference filter 5. The filter control section 172A includes a gap detection unit 172B, a feedback control unit 172C, and a microcomputer 172D.

The gap detection unit 172B is connected to the first mirror 54 and the second mirror 55 and detects the electrostatic capacitance between the first mirror 54 and the second mirror 55.

The feedback control unit 172C controls the drive voltage applied to the electrostatic actuator 56, based on a command value inputted from the microcomputer 172D. Specifically, the feedback control unit 172C controls the drive voltage applied to the electrostatic actuator 56, based on the electrostatic capacitance detected by the gap detection unit 172B and the electrostatic capacitance corresponding to a target wavelength inputted from the microcomputer 172D. This changes the mirror gap G to the dimension corresponding to the target wavelength.

The microcomputer 172D has a storage unit such as a memory and stores drive data to control the electrostatic actuator 56 (for example, V-λ data recording the drive voltage corresponding to a measurement wavelength transmitted through the variable-wavelength interference filter 5, and C-λ data recording the electrostatic capacitance corresponding to the measurement wavelength, and the like). The microcomputer 172D outputs a drive voltage and a target electrostatic capacitance corresponding to a target measurement wavelength to the feedback control unit 172C based on the command from the control unit 15.

Configuration of Light Receiving Element Holding Substrate

The light receiving element holding substrate 173 is fixed to the base 171 via a third fixing member 183. The third fixing member 183 is a non-elastic member and is made up of, for example, a metal or resin screw or the like. That is, the light receiving element holding substrate 173 is brought into contact with and is firmly fixed to the base 171 with a screw or the like.

The light receiving element holding substrate 173 is a substrate with the light receiving element 173A held thereon and is fixed to the base 171 at a position on the −Z side of the filter holding substrate 172 and where the optical axis of the light receiving element 173A coincides with the measurement optical axis L. The light receiving element holding substrate 173 also has various circuits which control the light receiving element 173A. The circuits are connected to the connector 174B.

Configuration of Cover Section

The cover section 174 is fixed, for example, to an outer circumferential edge of the base 171 and forms, with the base 171, a closed space (dark space) to accommodate the filter holding substrate 172, the light receiving element holding substrate 173, and the optical holding section 178, as shown in FIG. 3.

At a part of the cover section 174, an opening 174A is provided, in which the connector 174B is provided. The connector 174B is electrically connected to the control unit 15 and transmits a control signal from the control unit 15 to the light source 176, the filter holding substrate 172, and the light receiving element holding substrate 173.

Fixture of Filter Holding Substrate to Base

Next, the fixture of the filter holding substrate 172 to the base 171 (second base section 171B) using the first fixing member 181 will be described.

The first fixing member 181 fixes the filter holding substrate 172 to the second base section 171B and restrains the transmission of vibrations from the base 171 to the filter holding substrate 172.

The first fixing member 181 is provided, for example, at a plurality positions on the filter holding substrate 172. For example, in this embodiment, the filter holding substrate 172 is formed in a rectangular shape as viewed in a plan view from the Z direction, and the first fixing member 181 is arranged in each of the four corners of the filter holding substrate 172.

Now, vibrations generated in the base 171 will be described first.

Figure 6:
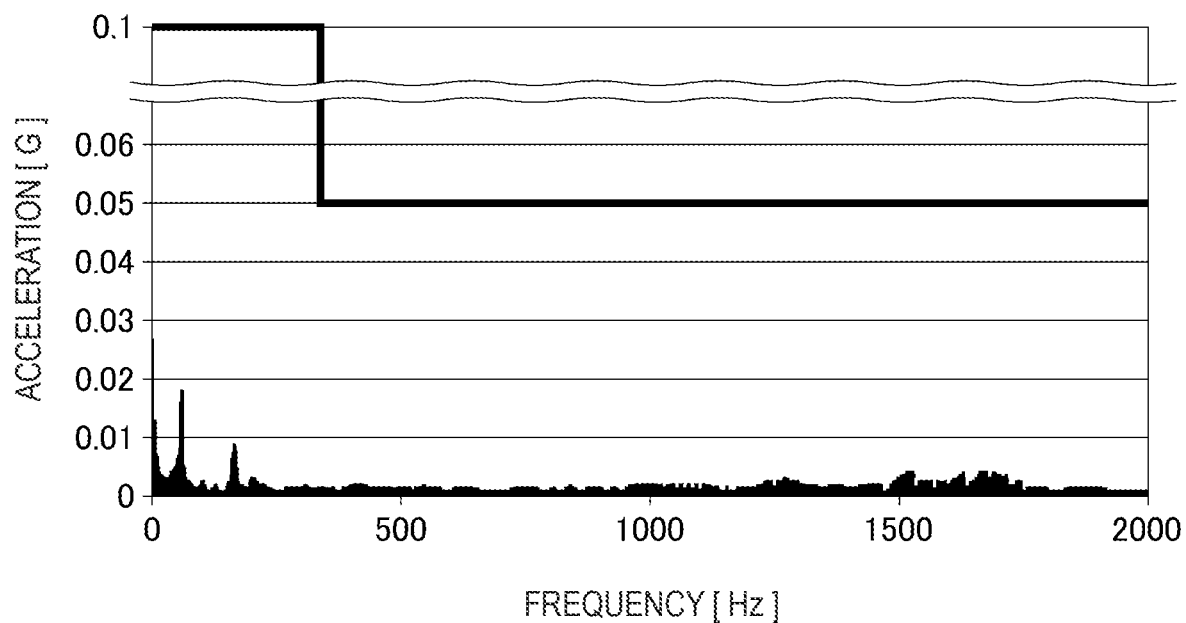
FIG. 6 shows the frequency of vibration in an X direction of a carriage according to the embodiment and the magnitude thereof (acceleration) when the carriage is driven.
Figure 7:
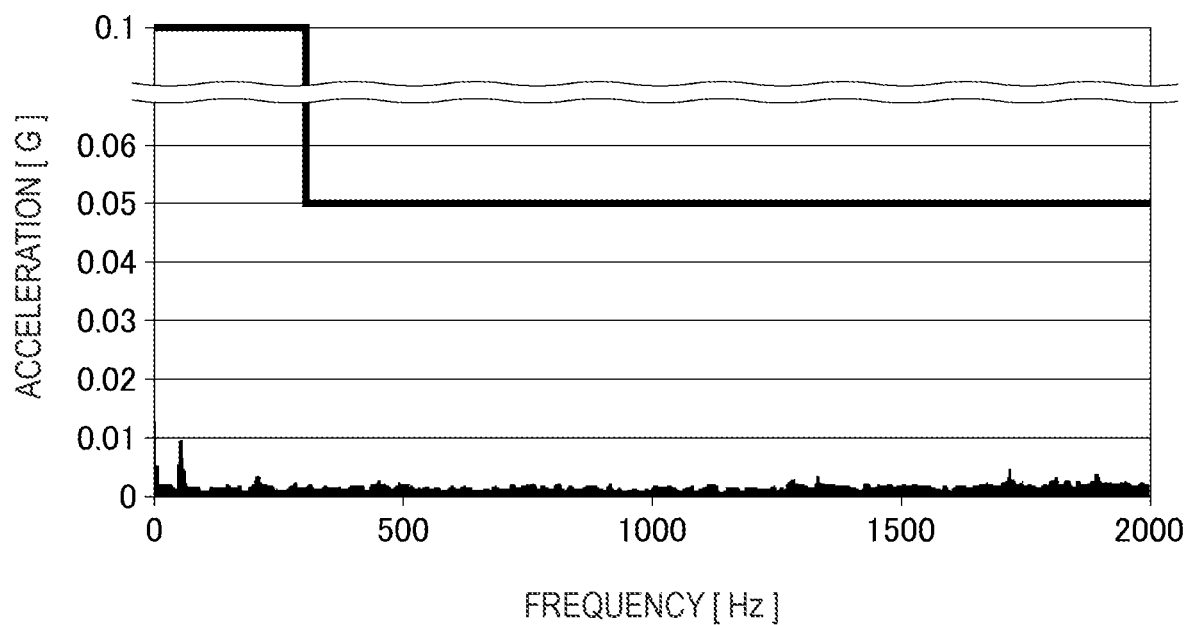
FIG. 7 shows the frequency of vibration in a Y direction of the carriage according to the embodiment and the magnitude thereof (acceleration) when the carriage is driven.
Figure 8:
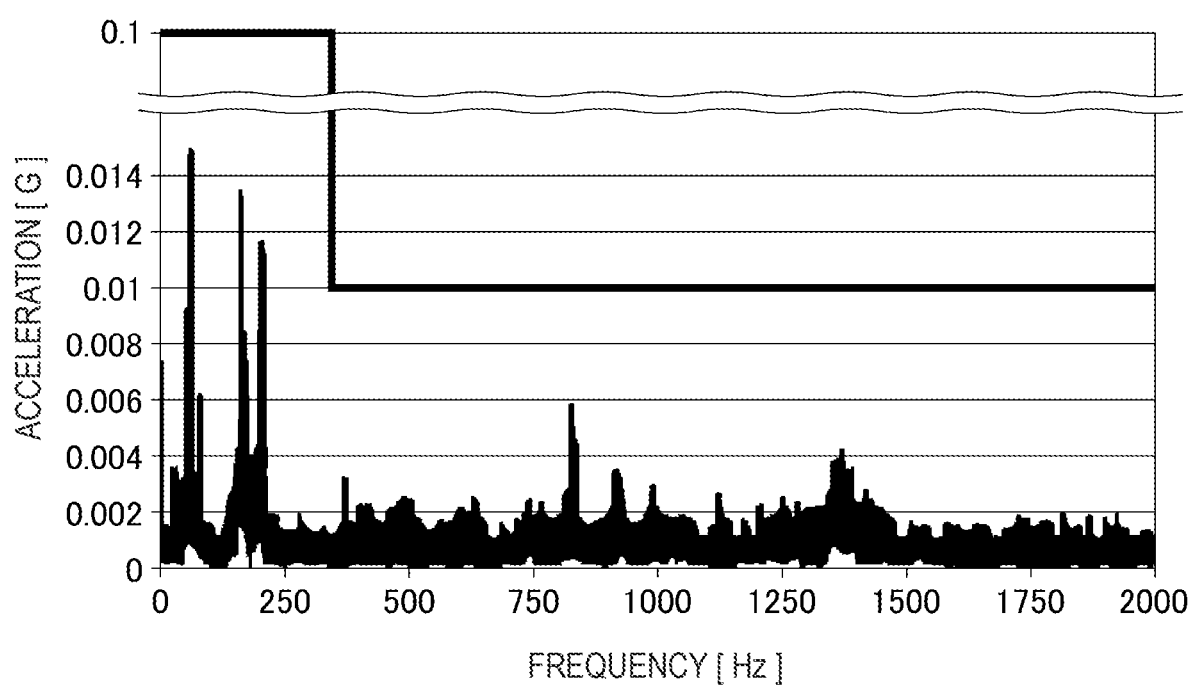
FIG. 8 shows the frequency of vibration in a Z direction of the carriage according to the embodiment and the magnitude thereof (acceleration) when the carriage is driven.

FIG. 6 shows the frequency of vibration ω in the X direction of the carriage 13 and the magnitude there of (acceleration) when the carriage 13 is driven. FIG. 7 shows the frequency of vibration ω the Y direction of the carriage 13 and the magnitude thereof (acceleration) when the carriage 13 is driven. FIG. 8 shows the frequency of vibration w in the Z direction of the carriage 13 and the magnitude thereof (acceleration) when the carriage 13 is driven.

As shown in FIGS. 6 to 8, when the carriage 13 is driven in the printer 1, vibrations occur in each direction. In this case, with respect to the X direction and the Y direction, if the frequency of vibration ω is lower than 250 Hz and the acceleration is lower than 0.1 G (where 1 G=9.8 m/s$^2$) and if the frequency of vibration ω is 250 Hz or higher and the acceleration is lower than 0.05 G, the carriage 13 can move normally and has no influence on the print unit 16. Thus, normal print processing can be carried out. Meanwhile, with respect to the Z direction, if the frequency of vibration ω is lower than 250 Hz and the acceleration is lower than 0.1 G and if the frequency of vibration w is 250 Hz or higher and the acceleration is lower than 0.01 G, the carriage 13 can move normally and has no influence on the print unit 16. Thus, normal print processing can be carried out.

That is, as a spectroscope, the carriage 13 is standardized in such a way as that the acceleration is lower than 0.1 G in each direction for vibrations with a frequency lower than 250 Hz and that the acceleration is lower than 0.05 G in the X direction and the Y direction and lower than 0.01 G in the Z direction for vibrations with a frequency of 250 Hz or higher.

However, the spectroscopic measurement processing by the spectroscope 17, in which the mirror gap G of the variable-wavelength interference filter 5 needs to be controlled in the order of nanometers, is more affected by vibrations than the print processing by the print unit 16.

As shown in FIGS. 6 to 8, when the carriage 13 is driven, vibrations with relatively high acceleration occur at 100 Hz to 250 Hz. The vibrations may change the mirror gap G of the variable-wavelength interference filter 5 and may affect wavelength accuracy.

Also, the wavelength of light transmitted through the variable-wavelength interference filter 5 changes as the movable section 521 vibrates. Therefore, the vibration of the movable section 521, that is, the change of the mirror gap G needs to be restrained in order to maintain the light transmitted through the variable-wavelength interference filter 5 to a constant wavelength and thus maintain wavelength accuracy.

Figure 9:
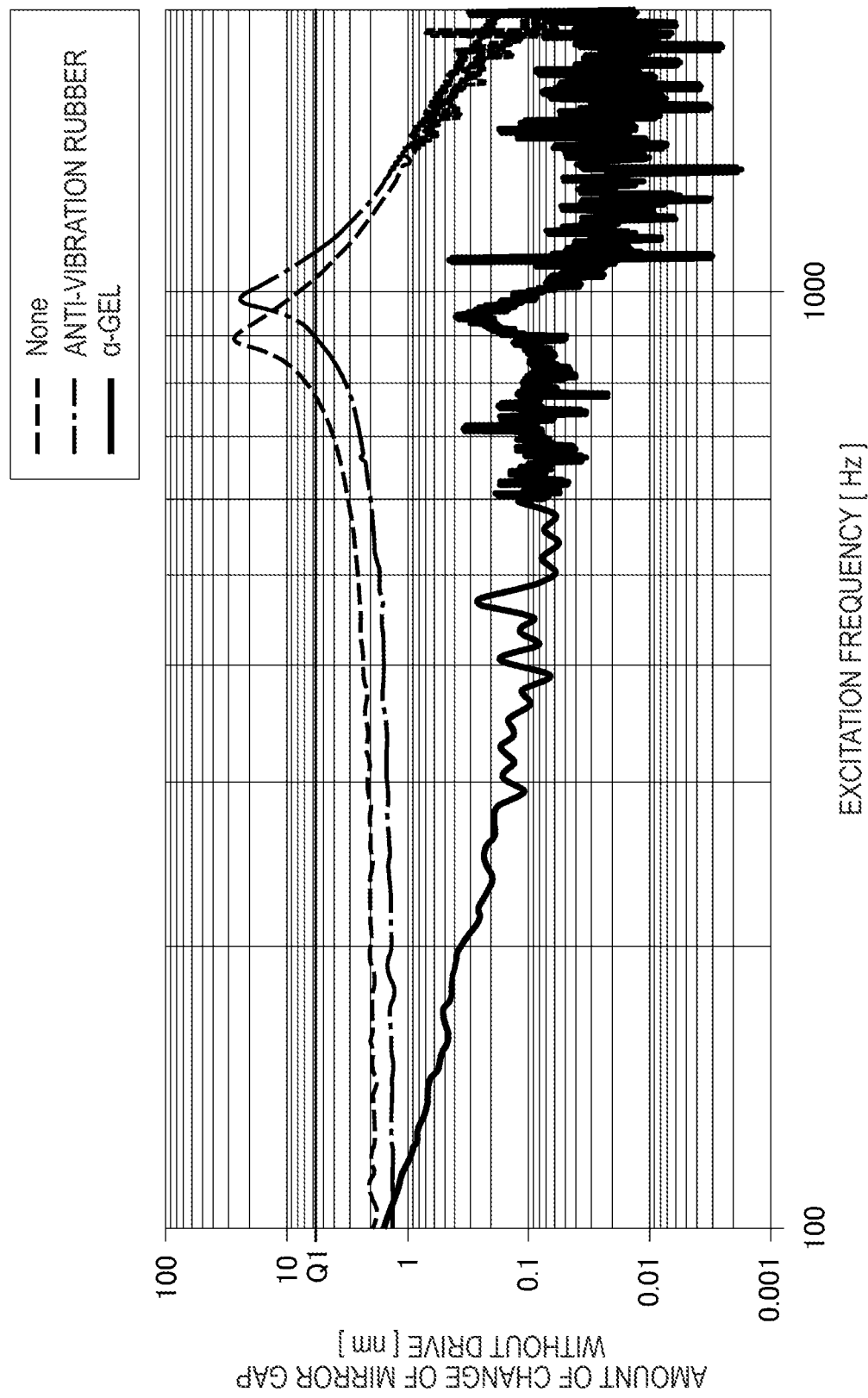
FIG. 9 shows the frequency of vibration transmitted to a variable-wavelength interference filter and the amount of change of a mirror gap due to the vibration.

FIG. 9 shows the frequency of vibration transmitted to the variable-wavelength interference filter 5 and the amount of change of the mirror gap G due to the vibration. In FIG. 9, a solid line shows the amount of change of the mirror gap G when the first fixing member 181 in the embodiment is used. A dashed line shows the amount of change of the mirror gap G when the filter holding substrate 172 is brought into contact with and fixed to the base 171 with a screw, instead of using the first fixing member 181. A dotted-dashed line shows the amount of change of the mirror gap G when an anti-vibration rubber is used instead of the first fixing member 181.

As shown in FIG. 9, to maintain the wavelength accuracy of variable-wavelength interference filter 5, the amount of change of the mirror gap G due to the transmission of vibrations needs to be restrained to less than an allowable value Q1 (in this embodiment, Q1≈6 nm).

Figure 10:
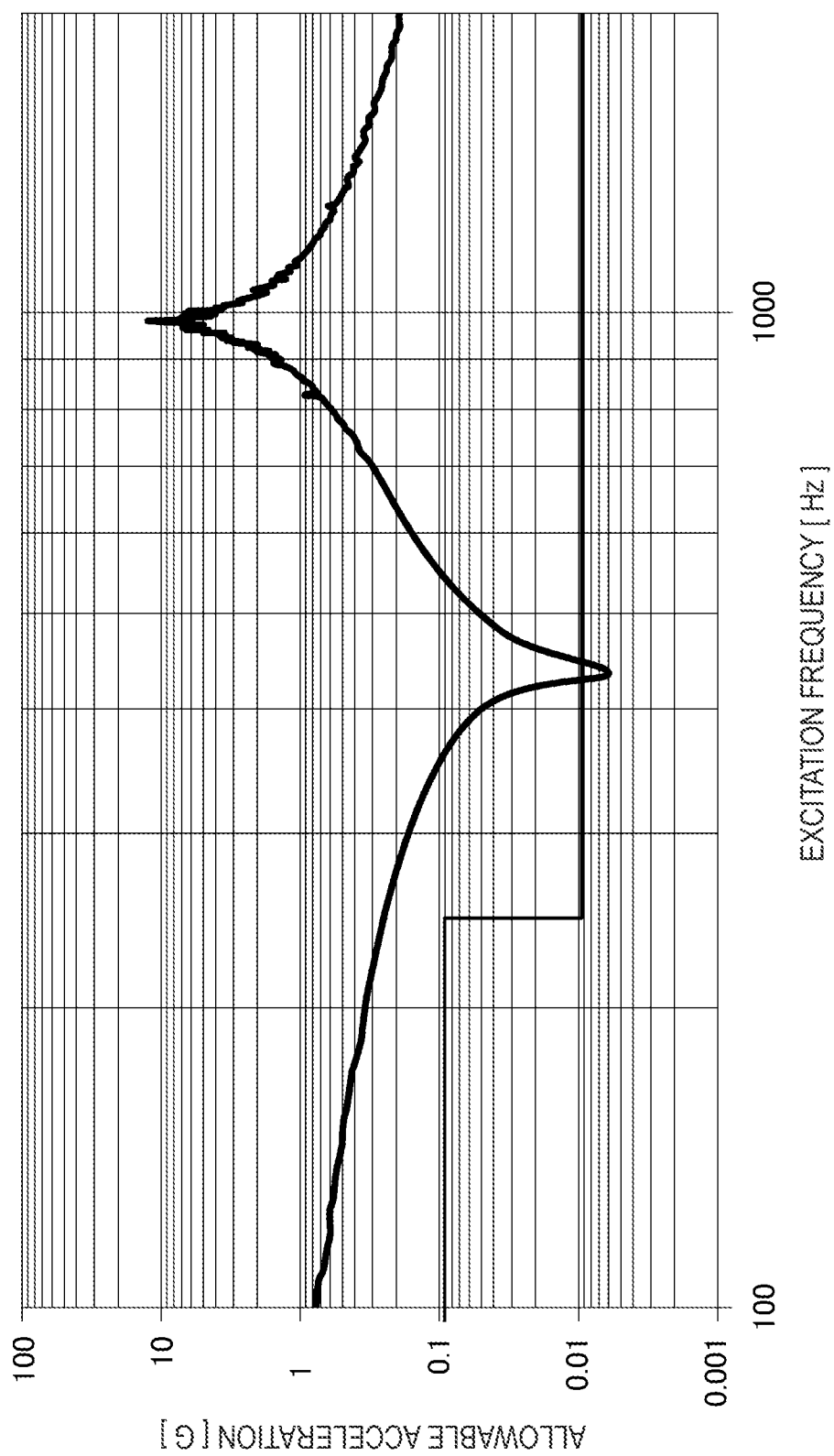
FIG. 10 shows the acceleration of vibration of the carriage allowed when the amount of change of the mirror gap is less than an allowable value.

FIG. 10 shows the acceleration of vibrations of the carriage 13 allowed when the amount of change of the mirror gap G is less than the allowable value Q1.

As described above, if the amount of change of the mirror gap G is less than the allowable value Q1, the acceleration (magnitude of vibrations) allowed for the vibrations of the carriage 13 varies from one frequency to another. The variable-wavelength interference filter 5 has a natural frequency of 400 Hz to approximately 1000 Hz, though it depends on the shape and material thereof. If vibrations with a frequency similar to the natural frequency are applied, the variable-wavelength interference filter 5 resonates, increasing the amount of change of the mirror gap G. In the example shown in FIG. 10, the natural frequency of the variable-wavelength interference filter 5 is near 450 Hz. Therefore, the allowed acceleration is smaller for a frequency similar to the natural frequency. In this case, as shown in FIG. 10, the allowable acceleration corresponding to the allowable value Q1 of the amount of change of the mirror gap G may be smaller than the value (0.01 G) prescribed for the carriage 13. Thus, the wavelength accuracy may be reduced by the vibrations of the carriage 13. The allowable acceleration needs to be equal to or greater than a prescribed acceleration set for the spectroscope.

Thus, in this embodiment, the first fixing member 181 is provided in order to restrain the transmission of vibrations of the carriage 13 (base 171) to the spectroscopic device 600 via the filter holding substrate 172.

The first fixing member 181 is made up of a material having a smaller spring constant k than the second fixing member 64 and the third fixing member 183. The spring constant k of the first fixing member 181 will now be described.

If vibrations with amount of displacement $x_0$ ($x_0 = a_0 \sin \omega t$) are generated in the base 171, the amount of displacement x generated in the filter holding substrate 172 and the spectroscopic device 600 is found by the following formula (1):

$$x = \frac{a_0 \sqrt{1 + \left(2\varsigma \frac{\omega}{p}\right)^2}}{\sqrt{\left(1 - \frac{\omega^2}{p^2}\right)^2 + \left(2\varsigma \frac{\omega}{p}\right)^2}} \sin(\omega t - \varphi) = a_1 \sin(\omega t - \varphi) \quad (1)$$

where $$\tan \varphi = \frac{\left(2\varsigma \frac{\omega}{p}\right)^2}{\left(1 - \frac{\omega^2}{p^2}\right)^2 + \left(2\varsigma \frac{\omega}{p}\right)^2}.$$

In the formula (1), p is an eigenvalue (natural angular frequency) calculated by $p = (k/m)^{1/2}$, where k is the spring constant of the first fixing member 181 and m is the total mass of the members (filter holding substrate 172 and the spectroscopic device 600) fixed to the base 171 by the first fixing member 181. The letter w is the angular frequency of vibrations that can occur in the base 171. The letter ξ is the damping rate, which is the ratio of the viscous damping coefficient c of the first fixing member 181 and the critical damping rate $c_c$ ($=2(mk)^{1/2}$) ($\varsigma = c/c_c$).

The transmission rate $T_R$ of vibrations (displacement) transmitted from the base 171 to the filter holding substrate 172 is found by the following formula (2):

$$T_R = \frac{a_1}{a_0} = \frac{\sqrt{1 + \left(2\varsigma \frac{\omega}{p}\right)^2}}{\sqrt{\left(1 - \frac{\omega^2}{p^2}\right)^2 + \left(2\varsigma \frac{\omega}{p}\right)^2}}. \quad (2)$$

Figure 11:
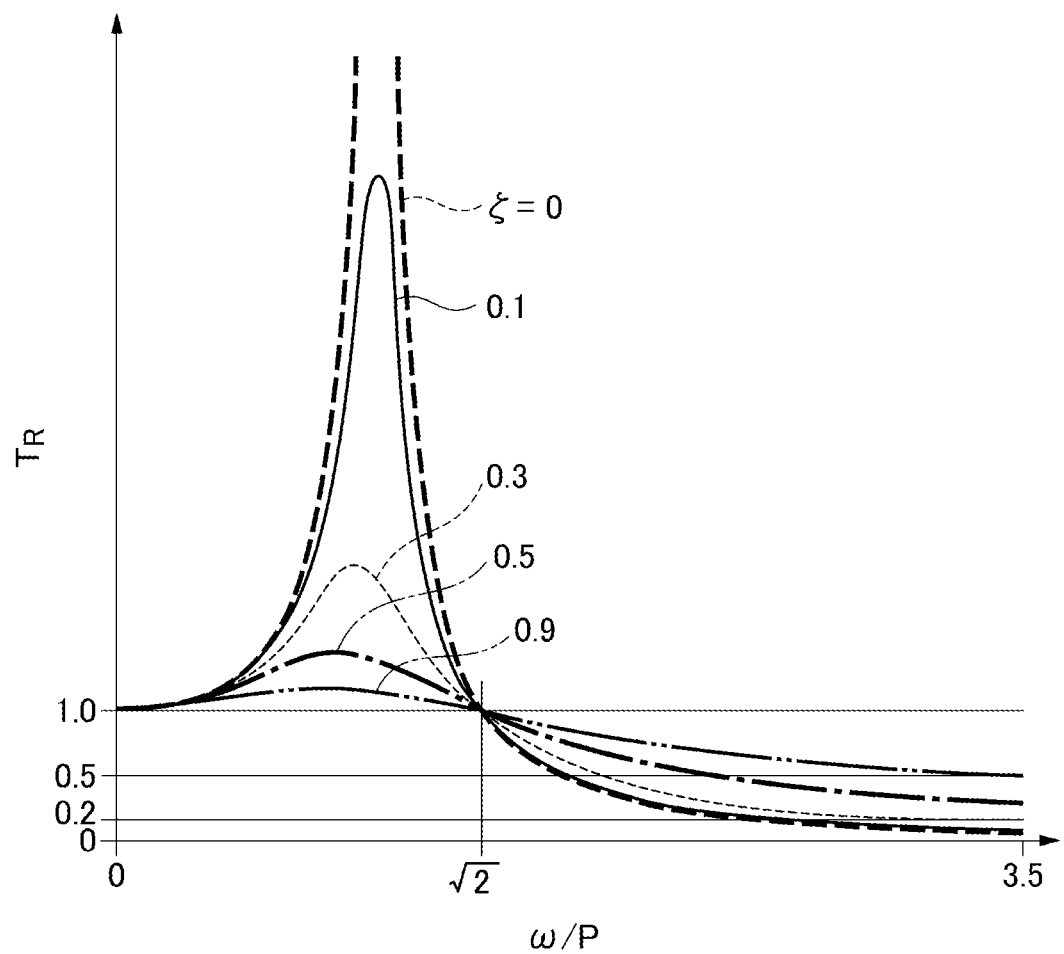
FIG. 11 shows the rate of transmission of vibrations from a base to the filter holding substrate.

FIG. 11 shows the transmission rate $T_R$ of vibrations from the base 171 (second base section 171B) to the filter holding substrate 172.

As shown in FIG. 11, if $\omega/p \leq 2^{1/2}$ holds, the vibrations of the base 171 are amplified and the amplified vibrations are transmitted to the filter holding substrate 172. Meanwhile, if $\omega/p > 2^{1/2}$ is satisfied, the vibrations transmitted from the base 171 to the filter holding substrate 172 are damped. The filter holding substrate 172 is thus restrained from vibrating.

Here, with $p = (k/m)^{1/2}$, the following formula (3) can be derived from the condition of $\omega/p > 2^{1/2}$:

$$k < \frac{m\omega^2}{2}. \quad (3)$$

That is, in this embodiment, the first fixing member 181 has the spring constant k satisfying the formula (3). This restrains the filter holding substrate 172 from vibrating, as described above.

To restrain the influence on the spectroscopic accuracy of the spectroscope 17, it is preferable to restrain vibrations generated when the carriage 13 is driven, to ⅕ or less. In this case, it is preferable that ω/p>3.5, as shown in FIG. 11. At this point, it is preferable that the damping ratio ξ satisfies ξ<0.3. That is, it is preferable that the spring constant k of the first fixing member 181 satisfies the following formula (4) and that the viscous damping coefficient c satisfies the following formula (5):

$$k < \frac{m\omega^2}{3.5^2} \left( = \frac{m\omega^2}{12.25} \right) \quad (4)$$

$$c < \sqrt{mk} < \frac{m\omega}{3.5}. \quad (5)$$

The spring constant k described here is a total for a plurality of (n) first fixing members 181. The spring constant $k_1$ of one first fixing member 181 is $k_1 = k/n$. that is, the formulae (3) and (4) can be modified into the following formulae (6) and (7):

$$k_1 < \frac{m\omega^2}{2n} \quad (6)$$

$$k_1 < \frac{m\omega^2}{12.25\,n}. \quad (7)$$

As shown in the formulae (3) to (7), the spring constant k and the viscous damping coefficient c of the first fixing member 181 can be found, based on a minimum value in a frequency range which restrains the transmission of vibrations.

As described above, in this embodiment, vibrations from the base 171 to the filter holding substrate 172 need to be restrained over 100 Hz to 250 Hz, where the carriage 13 tends to vibrate with high acceleration, that is, a frequency range close to the natural frequency of the variable-wavelength interference filter 5. If the frequency range of vibrations that should be restrained from being transmitted is 100 Hz or higher, the spring constant of the first fixing member 181 may simply satisfy a condition with respect to 100 Hz, which is a minimum frequency of vibration.

A more specific example will now be described. If the mass m of the spectroscopic device 600 and the filter holding substrate 172 is 5.0 (g) and the first fixing member 181 is provided in each of the four corners of the filter holding substrate 172 (n=4), the spring constant k of the first fixing member 181 may simply satisfy the condition expressed by the following formula (8):

$$k_1 < 5.0 \times \frac{(2\pi \times 100)^2}{12.25} \times \frac{1}{4} = 0.04 \text{ (N/mm)}. \quad (8)$$

In the embodiment, the spring constant $k_1$ of the first fixing member 181 is set to smaller than 0.04 (N/mm), as shown in the formula (8). It is preferable that the viscous damping coefficient c of the first fixing member 181 is smaller than 0.89 (N×s/m), based on the formula (5). As such a first fixing member 181, for example, a gel-like member made up mainly of silicone resin (for example, α-GEL (trademark registered) or the like) can be used.

Back to FIG. 9, the amount of change of the mirror gap G with the use of the first fixing member 181 in this embodiment will be described.

FIG. 9 shows, as comparative examples, the case where the filter holding substrate 172 is brought into contact with and firmly fixed to the base 171 with a screw (dashed line: comparative example 1) and the case where the filter holding substrate 172 is fixed to the base 171 via an anti-vibration rubber (dotted-dashed line: comparative example 2).

In the comparative example 1, since the filter holding substrate 172 is fixed to the base 171 with a screw, vibrations of the base 171 are transmitted to the variable-wavelength interference filter 5. Therefore, as shown in FIG. 9, at some frequencies (in the example of FIG. 9, near 900 Hz close to the natural frequency of the entirety of the filter holding substrate 172 with the spectroscopic device 600 installed thereon), the amount of vibrations of the filter holding substrate 172 increases due to resonance, and the amount of change of the mirror gap G exceeds the allowable value Q1.

In the comparative example 2, a member that satisfies $\omega/p \leq 2^{1/2}$ is used as the anti-vibration rubber. In this case, if the excitation frequency is low, the change of the mirror gap G can be restrained more than in the comparative example 1. However, as in the comparative example 1, the amount of change of the mirror gap G exceeds the allowable value Q1 at some frequencies and is greater than in the comparative example 1 at the subsequent frequencies (high-frequency range). That is, the natural frequency of the entirety of the filter holding substrate 172 with the spectroscopic device 600 installed thereon simply shifts to the high-frequency side. Therefore, vibrations of the filter holding substrate 172 due to resonance cannot be sufficiently restrained, thus causing the mirror gap G to change.

Meanwhile, in the embodiment, as shown by the solid line in FIG. 9, the use of the first fixing member 181 as described above can significantly reduce the amount of change of the mirror gap G to less than 1 nm from the low-frequency range to the high-frequency range. The amount of change of the mirror gap G is reduced also near the natural frequency range (900 Hz to 1000 Hz) of the filter holding substrate 172. Therefore, the resonance of the filter holding substrate 172 and the variable-wavelength interference filter 5 is restrained and the change of the mirror gap G due to the resonance is significantly reduced.

Advantageous Effects of First Embodiment

In the printer 1 according to this embodiment, the spectroscope 17 is installed in the carriage 13 movable in the X direction. The spectroscope 17 has the base 171 fixed to the carriage 13, and the filter holding substrate 172 with the spectroscopic device 600 fixed thereon. The filter holding substrate 172 is fixed to the base 171 by the first fixing member 181. The first fixing member 181 has a spring constant that satisfies the formula (3).

Such a configuration damps vibrations transmitted from the base 171 to the filter holding substrate 172, even if the carriage 13 vibrates when driven or the like and the vibrations are transmitted to the base 171. Therefore, the transmission of vibrations from the carriage 13 to the variable-wavelength interference filter 5 inside the spectroscopic device 600 is restrained and the change of the mirror gap G due to the vibrations is restrained. This enables the variable-wavelength interference filter 5 to accurately transmit light with a desired target wavelength.

In the embodiment, the spring constant of the first fixing member 181 satisfies the formula (4). This can reduce the transmission rate $T_R$ of vibrations from the base 171 to the filter holding substrate 172 to 0.5 or less. The change of the mirror gap G can thus be restrained more effectively.

In this case, it is preferable that the viscous damping coefficient c of the first fixing member 181 satisfies the formula (5). This can reduce the transmission rate $T_R$ of vibrations from the base 171 to the filter holding substrate 172 to 0.2 or less. The change of the mirror gap G can thus be restrained further. The variable-wavelength interference filter 5 can more accurately transmit light with a target wavelength.

In the embodiment, the variable-wavelength interference filter 5 is fixed to the casing 610 of the spectroscopic device 600, by the second fixing member 64 having a greater spring constant than the first fixing member 181. Thus, the inconvenience of the variable-wavelength interference filter 5 tilting in relation to the casing 610 or the like can be restrained.

In the embodiment, in the spectroscope 17, the light receiving element holding substrate 173 is brought into contact with and fixed to the base 171 with a screw. That is, the light receiving element holding substrate 173 is firmly fixed to the base 171 with a fixing member (screw) having a greater spring constant than the first fixing member 181.

Therefore, even if disturbance vibrations are generated in the base 171, the relative positional relation between the base 171 and the light receiving element 173A does not change and the distance between the medium M (measurement target object) and the light receiving element 173A does not change, either. This can restrain change in measurement accuracy.

Modifications

The invention is not limited to the foregoing embodiment and includes modifications, improvement and the like within a range that allows the achievement of the object of the invention.

For example, while an example where the filter holding substrate 172 is fixed by the four first fixing members 181 is described in the embodiment, this example is not limiting. Five or more first fixing members 181 may be provided. Alternatively, one to three first fixing members 181 may be provided. Each first fixing member 181 may simply have a spring constant that satisfies the formula (6), preferably the formula (7), where n is the number of first fixing members 181 provided.

While it is described as preferable that the viscous damping coefficient of the first fixing member 181 satisfies the formula (5), this is not limiting. The transmission of vibrations is more restrained as the viscous damping coefficient of the first fixing member 181 becomes smaller. However, as shown in FIG. 11, if the spring constant of the first fixing member 181 satisfies the formula (3), the transmission rate $T_R$ of vibrations transmitted from the base 171 to the filter holding substrate 172 can be reduced to less than 1 regardless of the value of the viscous damping coefficient.

While an example where the light receiving element holding substrate 173 is fixed by the third fixing member 183 having a greater spring constant than the first fixing member 181 is described in the embodiment, this example is not limiting. For example, the light receiving element holding substrate 173 may be fixed to the base 171 by a fixing member having the same spring constant as the first fixing member 181. In this case, the transmission of vibrations of the base 171 to the light receiving element 173A can be restrained.

Also, while the printer 1 is described as an example of the electronic apparatus, this is not limiting. For example, a measuring device which does not have the print unit 16 and only carries out measurement on the medium M may be employed. Also, the optical module according to the invention may be incorporated, for example, in a quality inspection device which carries out quality inspection on a printed matter manufactured at a plant or the like. The optical module according to the invention may also be incorporated in any electronic apparatus.

Specific structures employed to carry out the invention can be suitably changed to other structures or the like within a range that allows the achievement of the object of the invention.

The entire disclosure of Japanese Patent Application No. 2017-146221 filed Jul. 28, 2017 is expressly incorporated by reference herein.

What is claimed is:
1. An optical module comprising:
   a spectroscopic device including:
      an interference filter having a first substrate having a first mirror, and a second substrate having a second mirror, wherein the first mirror faces the second mirror; and
      a casing including a pedestal and a sidewall connected to the pedestal that houses the interference filter, wherein the interference filter is fixed to the sidewall of the casing by a first fixing member;
   a filter holding member to which the casing is fixed;
   a base that is separate and apart from the filter holding member; and
   a second fixing member which fixes the filter holding member to the base,
   wherein $k < m\omega^2/2$ is satisfied, where k is a spring constant of the second fixing member, $\omega$ is a frequency of vibration of the base that is equal to 100 Hz and generated by movement of the optical module, and m is a total mass of the spectroscopic device and the filter holding member.
2. An electronic apparatus comprising:
   the optical module according to claim 1; and
   a controller which controls the optical module.
3. The optical module according to claim 1, wherein the spring constant of the second fixing member satisfies $k < m\omega^2/12.25$.
4. An electronic apparatus comprising:
   the optical module according to claim 3; and
   a controller which controls the optical module.
5. The optical module according to claim 1, wherein the first fixing member has a spring constant greater than the spring constant of the second fixing member.
6. An electronic apparatus comprising:
   the optical module according to claim 5; and
   a controller which controls the optical module.
7. The optical module according to claim 1, further comprising:
   a light receiver which receives light transmitted through the interference filter; and
   a third fixing member which fixes the light receiver to the base,
   wherein the third fixing member has a spring constant greater than the spring constant of the second fixing member.
8. An electronic apparatus comprising:
   the optical module according to claim 7; and
   a controller which controls the optical module.

\* \* \* \* \*